United States Patent
Iwata

(10) Patent No.: US 6,762,837 B2
(45) Date of Patent: Jul. 13, 2004

(54) POLARIZATION COMPENSATOR AND WAVELENGTH DIVISION MULTIPLEXING APPARATUS USING SAME

(75) Inventor: Hiroyuki Iwata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 183 days.

(21) Appl. No.: 09/983,186

(22) Filed: Oct. 23, 2001

(65) Prior Publication Data

US 2002/0176080 A1 Nov. 28, 2002

(30) Foreign Application Priority Data

May 28, 2001 (JP) ........................................ 2001-159599

(51) Int. Cl.[7] ................................ G01J 4/00; G02F 1/07
(52) U.S. Cl. ........................ 356/368; 356/364; 359/249
(58) Field of Search ................................ 356/369, 368, 356/364, 370; 359/246, 279, 281, 249

(56) References Cited

U.S. PATENT DOCUMENTS 6,373,614 B1 * 4/2002 Miller ........................ 359/237

FOREIGN PATENT DOCUMENTS

| JP | 62-24731 | 2/1987 |
| JP | 8-110497 | 4/1996 |
| JP | 8-256128 | 10/1996 |
| JP | 2000-32048 | 1/2000 |

* cited by examiner

Primary Examiner—Frank G. Font
Assistant Examiner—Roy M. Punnoose
(74) Attorney, Agent, or Firm—Staas & Halsey LLP

(57) ABSTRACT

In a polarization compensator for converting a polarization state of a lightwave, and a wavelength division multiplexing apparatus using same, a controller of the polarization compensator controls a rotator to orient a polarization plane of an input lightwave to a polarization plane of a reference polarizer. Also, the controller receives an output lightwave from the polarization compensator, of the above-mentioned present invention, which inputs the input lightwave through the rotator and a first ¼ wave plate, through a second ¼ wave plate and a polarizer having the polarization plane set in the reference direction, and the input lightwave is compensated to a linear polarization having the polarization plane of the reference direction based on a received polarization signal. Furthermore, a plurality of polarization compensators and a coupler are connected directly or with a connector so as to prevent the polarization planes of the lightwaves whose wavelengths are adjoining from coinciding with each other, and preferably the polarization compensators and the coupler are connected directly or with connectors so that the polarization planes are orthogonal.

36 Claims, 7 Drawing Sheets ing POLARIZATION COMPENSATOR AND
WAVELENGTH DIVISION MULTIPLEXING
APPARATUS USING SAME

BACKGROUND OF THE INVENTION

1. Field of the Invention

The present invention relates to a polarization compensator and a wavelength division multiplexing (WDM) apparatus, and in particular to a polarization compensator for compensating a polarization state of a lightwave and a wavelength division multiplexing apparatus using same.

Characteristics of optical phenomena differ, in many cases, depending on a polarization state such as a reflection and a refraction. Also, various optical circuits utilizing a polarization dependency have been considered in which a change of an electric quantity, a magnetic quantity, distortion, or the like is converted into a change of a refractive index. In such optical circuits, it is important to input a lightwave in a predetermined polarization state.

Also, in an optical transmission, a wavelength division multiplexing method has been adopted responsive to a recent demand for a large-capacity transmission. In this wavelength division multiplexing method, it is important to transmit many lightwaves whose wavelengths are different from each other through an optical fiber.

2. Description of the Related Art

[1] FIGS. 7A and 7B show an optical isolator 90 as an example of an optical circuit having a general polarization dependency. The optical isolator 90 is composed of a polarizer 91, a magneto-optical rotator 92 with 45° taking advantage of the Faraday effect, and an analyzer 93 arranged on z-axis in series. The directions of the polarizer 91 and the analyzer 93 are respectively set to have 0° and 45° with respect to x-axis.

As shown in FIG. 7A, a lightwave 64 of a liner polarization, inputted from the polarizer 91, whose polarization plane P1 is on xz plane, is rotated by 45° at the rotator 92 to pass through the analyzer 93 as an output lightwave 65 without losses. Oppositely, as shown in FIG. 7B, a polarization inputted from the analyzer 93 and rotated by 45° is further rotated by 45° at the rotator 92, and a polarization plane P2 becomes a linear polarization on yz plane, so that it can not pass through the polarizer 91.

Thus, the optical isolator 90 has a function of blocking that the linear polarization outputted from e.g. the analyzer 93 is reflected by e.g. an optical fiber to be passed through in the opposite direction.

Also, in order to pass through the optical isolator 90 without losses, the lightwave 64 must be a linear polarization whose polarization plane P1 is on the xz plane. Accordingly, in order for a lightwave of an arbitrary polarization to pass through the optical isolator 90, the polarization plane P1 is required to be converted into a linear polarization on the xz plane.

[2] FIG. 8 shows an arrangement of a wavelength division multiplexing (hereinafter, occasionally abbreviated as WDM) optical transmission apparatus 201. Lightwaves whose wavelengths are different from each other transmitted from optical transmitters 30_1-30_n (hereinafter, occasionally represented by a reference numeral 30) are respectively inputted to a coupler 35 through optical fibers 32_1-32_n (hereinafter, occasionally represented by a reference numeral 32), optical amplifiers 31_1-31_n (hereinafter, occasionally represented by a reference numeral 31), and optical fibers 32'_1-32'_n (hereinafter, occasionally represented by a reference numeral 32').

The coupler 35 couples the inputted lightwaves to be outputted to an optical fiber 36. An optical amplifier 38 amplifies the lightwaves to which the wavelength division multiplexing is performed, and relays the same to the subsequent stage. Thus, a wavelength division multiplexing is a technology capable of increasing a transmission capacity of a single optical fiber by transmitting many lightwaves whose optical frequencies are different from each other through the single optical fiber.

For increasing the number of wavelengths in the wavelength division multiplexing, it is effective to narrow an interval between optical frequencies whose wavelengths are adjoining. However, to narrow the interval between the optical frequencies causes the following problems: (1) a problem of crosstalk between signals, especially of coherent crosstalk between signals caused by a spread spectrum upon a signal modulation, and (2) a problem of crosstalk between wavelengths caused by a non-linear effect of an optical fiber.

[1] Although various optical circuits for converting a lightwave into a linear polarization of a predetermined direction have been devised, there has been no simple optical circuit for converting a lightwave of an arbitrary polarization into a linear polarization of a predetermined direction only with an electric signal without a mechanical operation.

[2] On the other hand, as a method of overcoming the WDM problems, a transmission method of orthogonal polarization has been proposed. In this method, polarization directions of signal lights for odd even channels are orthogonalized to be transmitted. Namely, a transmitter sets the polarization directions of the optical signals for the odd even channels to be orthogonal and transmits the same. The orthogonal state is almost maintained in an optical transmission line.

In the WDM optical transmission apparatus 201 with n-channels shown in FIG. 8, the polarization states from the optical transmitter 30 to the coupler 35 are not managed, so that the polarization relationship between the channels is random.

The optical fibers 32 and 32' of the WDM optical transmission apparatus 201 are connected with a polarization holding fiber, thereby enabling the orthogonal state to be held. However, there is a problem that the optical amplifier 31 composed of an erbium-doped polarization holding fiber has a low manufacturability and is expensive.

Also, in case of a WDM optical transmission apparatus 202 where the distance between the transmitters 30_1-30_n and the coupler 35 is long, the arrangement where the optical transmitters 30_1-30_n and the coupler 35 are respectively connected with the optical amplifiers 31_1-31_n, dispersion compensating fibers 33_1-33_n, and optical amplifiers 34_1-34_n is essential, and the dispersion must be compensated by the polarization holding fiber, so that there is a problem that the practicability of this arrangement is low.

Thus, in the prior art, there has been no WDM optical transmission apparatus having a method and an arrangement of a practical level on which polarizations of a plurality of modulated optical signals are managed, and odd even channels are mutually orthogonalized to be coupled.

SUMMARY OF THE INVENTION

It is accordingly an object of the present invention to provide a polarization compensator for converting a lightwave only a linear polarization or at least one of a linear polarization, a circular polarization, and an elliptical polarization into a linear polarization having a polarization plane of a predetermined direction, and a wavelength division multiplexing apparatus for coupling lightwaves so as to prevent polarization planes of the lightwaves whose wavelengths are adjoining from coinciding with each other by using the polarization compensator.

It is to be noted that the "polarization compensation" in the specification of the present invention means that a lightwave of an arbitrary polarization is converted into a linear polarization having a polarization plane of a predetermined direction.

In order to achieve the above-mentioned object, a polarization compensator according to the present invention comprises: a rotator for rotating an input lightwave by an angle designated with a control signal and providing an output lightwave; a polarizer, having a polarization plane set in a reference direction, for inputting the output lightwave; and a controller for outputting the control signal which gives instructions to make a polarization plane of the input lightwave the reference direction based on a polarization signal from the polarizer (claim 1).

Namely, a rotator outputs an input lightwave rotated by an angle designated with a control signal from a controller as an output lightwave. As for a polarizer which inputs the output lightwave, a polarization plane is set in a reference direction. The controller gives instructions to the rotator with the control signal, based on a polarization signal from the polarizer, to make the polarization plane of the input lightwave the reference direction.

Thus, the polarization plane of the input lightwave is compensated to the output lightwave having the polarization plane of the reference direction.

Also, in the present invention according to the above-mentioned invention, the controller may comprise an oscillator for outputting a modulating signal; a polarization signal detector for converting the polarization signal from the polarizer into an electric signal; a phase comparator for determining whether the modulating signal and the electric signal are in phase or opposite phase (anti-phase), or whether or not a frequency of the electric signal is twice as high as a frequency of the modulating signal; a rotator controller for outputting the control signal which designates a rotation angle, based on a determination result of the phase comparator so that the frequency of the electric signal becomes twice as high as the frequency of the modulating signal only when the modulating signal and the electric signal are in phase or opposite phase; and a modulator for modulating the control signal with the modulating signal (claim 2).

Namely, an oscillator outputs a modulating signal. A polarization signal detector converts the polarization signal from the polarizer into an electric signal. A phase comparator determines whether the modulating signal and the electric signal are in phase or opposite phase, or whether or not a frequency of the electric signal is twice as high as that of the modulating signal. A rotator controller provides the control signal to the above-mentioned rotator, which designates a rotation angle based on a determination result of the phase comparator.

Thus, the controller can instruct the above-mentioned rotator to compensate the polarization plane of the input lightwave to the reference direction with the control signal.

Also, in the present invention according to the above-mentioned invention, a branching portion may further be comprised for branching an output lightwave from the rotator to be provided to the polarizer (claim 3).

Namely, a branching portion can branch an output lightwave of the rotator to be provided to the polarizer. Another branched output lightwave of the branching portion may be made the output lightwave of the entire polarization compensator.

Also, in the present invention according to the above-mentioned invention, a branching portion may further be comprised for branching an output lightwave from the polarizer to be provided to the polarization signal detector (claim 4).

Namely, a branching portion can branch an output lightwave from the polarizer to be provided to the polarization signal detector. The other branched output lightwave of the branching portion may be made the output lightwave of the entire polarization compensator.

Also, in the present invention according to the above-mentioned invention, when the rotator is named a first rotator, a second rotator may further be comprised for receiving a lightwave branched from the branching portion to be provided to the polarizer; and the controller may include an oscillator for outputting a modulating signal; a second rotator controller for controlling a rotation angle of the second rotator with the modulating signal; a polarization signal detector for converting the polarization signal from the polarizer into an electric signal; a phase comparator for determining whether the modulating signal and the electric signal are in phase or opposite phase, or whether or not a frequency of the electric signal is twice as high as a frequency of the modulating signal; and a first rotator controller for outputting the control signal which designates a rotation angle of the first rotator, based on a determination result of the phase comparator so that the frequency of the electric signal becomes twice as high as the frequency of the modulating signal only when the modulating signal and the electric signal are in phase or opposite phase (claim 5).

Namely, an oscillator outputs a modulating signal. A second rotator controller controls a rotation angle of the second rotator with the modulating signal. The lightwave outputted from the branching portion is inputted to a polarization signal detector through the second rotator and the polarizer to be converted into the electric signal at the polarization signal detector.

A phase comparator determines whether the modulating signal and the electric signal are in phase or opposite phase, or whether or not a frequency of the electric signal is twice as high as that of the modulating signal. Based on this determination result, a first rotator controller outputs the control signal for designating a rotation angle of the first rotator.

Thus, the first rotator can compensate the input lightwave to the output lightwave having the polarization plane of the reference direction designated by the polarization plane of the polarizer.

Also, in the present invention according to the above-mentioned invention, when the modulating signal and the electric signal are in phase or opposite phase, the phase comparator may include an amplitude of the electric signal in the determination result to be notified to the rotator controller, and the rotator controller may output the control signal based on the amplitude (claim 6).

Also, in the present invention according to the above-mentioned invention, when the polarizer is named a first polarizer, a second polarizer, having a polarization plane set in a direction different from the reference direction, for inputting a lightwave branched from the branching portion may further be comprised; and the controller may include a first polarization signal detector for converting the polarization signal from the first polarizer into a first electric signal; a second polarization signal detector for converting a polarization signal from the second polarizer into a second electric signal; and a rotator controller for outputting the control signal which designates a rotation angle of the rotator based on a difference between the first and the second electric signals (claim 7).

Namely, a first and a second polarizers whose polarization planes are different from each other are provided. The lightwaves branched from the branching portion are provided to the first and the second polarizers. A first and a second polarization signal detectors convert the polarization signals from the polarizers into a first and a second electric signals. A rotator controller outputs the control signal, based on the difference between the first and the second electric signals, which designates a rotation angle of the rotator.

Thus, the rotator can compensate the polarization plane of the input lightwave to the polarization plane of the reference direction.

Also, in order to achieve the above-mentioned object, the present invention may comprise: a rotator for rotating a polarization plane of an input lightwave by an angle designated with a control signal to provide an output lightwave; a first ¼ wave plate for inputting the output lightwave of the rotator; a polarization compensator, according to claim 1, for inputting the output lightwave of the first ¼ wave plate; a branching portion for branching the output lightwave of the polarization compensator; a second ¼ wave plate for inputting the lightwave branched from the branching portion; a polarizer, having a polarization plane set in a reference direction, for inputting the output lightwave of the second ¼ wave plate; and a controller for outputting the control signal which gives instructions to compensate the input lightwave to a linear polarization having the polarization plane of the reference direction based on a polarization signal from the polarizer (claim 8).

Namely, a rotator rotates the polarization plane of an input lightwave by an angle designated with a control signal to provide an output lightwave. A polarization compensator according to claim 1 inputs the output lightwave of the rotator through the first ¼ wave plate.

A polarizer having a polarization plane set in a reference direction receives the output lightwave of the polarization compensator through the branching portion and the second ¼ wave plate. A controller outputs the control signal which gives instructions to convert the input lightwave to a linear polarization having the polarization plane of the reference direction.

Thus, the input lightwave of a linear polarization, a circular polarization, or an elliptical polarization is compensated to a linear polarization having the polarization plane of the reference direction.

Also, in the present invention according to the above-mentioned invention, the controller may comprise an oscillator for outputting a modulating signal; a polarization signal detector for converting the polarization signal from the polarizer into an electric signal; a phase comparator for determining whether the modulating signal and the electric signal are in phase or opposite phase, or whether or not a frequency of the electric signal is twice as high as a frequency of the modulating signal; and a rotator controller for outputting the control signal which designates a rotation angle, based on a determination result of the phase comparator so that the frequency of the electric signal becomes twice as high as the frequency of the modulating signal only when the modulating signal and the electric signal are in phase or opposite phase (claim 9).

Namely, an oscillator outputs a modulating signal. A polarization signal detector converts the polarization signal from the above-mentioned polarizer into an electric signal. A phase comparator determines whether the modulating signal and the electric signal are in phase or opposite phase, or whether or not a frequency of the electric signal is twice as high as that of the modulating signal. Based on this determination result, a rotator controller provides the control signal which designates a rotation angle to the rotator.

Thus, the controller can perform control of compensating the input lightwave of the rotator to the linear polarization having the polarization plane of the reference direction.

Also, in the present invention according to the above-mentioned invention, when the rotator is named a second rotator, a third rotator inserted between the branching portion and the polarizer may further be comprised; and the controller may include an oscillator for outputting a modulating signal; a third rotator controller for controlling a rotation angle of the third rotator with the modulating signal; a polarization signal detector for converting the polarization signal from the polarizer into an electric signal; a phase comparator for determining whether the modulating signal and the electric signal are in phase or opposite phase, or whether or not a frequency of the electric signal is twice as high as a frequency of the modulating signal; and a second rotator controller for outputting the control signal which designates a rotation angle of the second rotator, based on a determination result of the phase comparator so that the frequency of the electric signal becomes twice as high as the frequency of the modulating signal only when the modulating signal and the electric signal are in phase or opposite phase (claim 10).

Namely, an oscillator outputs a modulating signal. A third rotator controller controls the rotation angle of the third rotator with the modulating signal. A polarization signal detector converts the lightwave, into an electric signal, from the above-mentioned branching portion received through the third rotator and the polarizer.

A phase comparator determines whether the modulating signal and the electric signal are in phase or opposite phase, or whether or not a frequency of the electric signal is twice as high as that of the modulating signal. Based on this determination result, a second rotator controller outputs the control signal which designates a rotation angle of the second rotator.

Thus, the controller can perform control of compensating the input lightwave of the rotator to a linear polarization having the polarization plane of the reference direction.

Also, in the present invention according to the above-mentioned invention, when the polarizer is named a first polarizer, a second polarizer, having a polarization plane set in a direction different from the reference direction, for inputting the lightwave from the ¼ wave plate may further be comprised; and the controller may include a first polarization signal detector for converting the polarization signal from the first polarizer into a first electric signal; a second polarization signal detector for converting a polarization signal from the second polarizer into a second electric signal; and a rotator controller for outputting the control signal which designates a rotation angle of the rotator based on a difference between the first and the second electric signals (claim 11).

Also, in the present invention according to the above-mentioned invention, the controller may comprise only a light/electricity converter for converting the polarization signal into an electric signal; and an electric circuit for outputting the control signal based on the electric signal (claim 12).

Also, in the present invention, a wavelength division multiplexing apparatus may comprise a plurality of polarization compensators according to the above-mentioned invention; and a coupler for coupling a lightwave of a linear polarization from the polarization compensators; and the polarization compensators and the coupler may be connected so as to prevent polarization planes of adjoining lightwaves from coinciding with each other (claim 13).

Also, in the present invention according to the wavelength division multiplexing apparatus of the above-mentioned present invention, a junction, having a connecting mechanism which prevents the polarization planes of the adjoining lightwaves from coinciding with each other, may be provided between the polarization compensators and the coupler (claim 14).

Namely, by a mechanism of a junction, it becomes possible to prevent the polarization planes of the adjoining lightwaves from coinciding with each other.

Also, in the present invention according to the wavelength division multiplexing apparatus of the above-mentioned present invention, the polarization planes of the adjoining output lightwaves may be connected to be orthogonal (claim 15).

Also, in the present invention, a wavelength division multiplexing optical transmission apparatus may comprise: a plurality of optical transmitters whose output wavelengths are different from each other; and the above-mentioned wavelength division multiplexing apparatus for inputting the output lightwaves of the optical transmitters (claim 16).

BRIEF DESCRIPTION OF THE DRAWINGS

Throughout the figures, like reference numerals indicate like or corresponding components.

DESCRIPTION OF THE EMBODIMENTS

Hereinafter, embodiments of a polarization compensator according to the present invention will be described. A polarization compensator in this embodiment comprises: a rotator for rotating an input lightwave by an angle designated with a control signal to provide an output lightwave, a polarizer, having a polarization plane set in a reference direction, for inputting the output lightwave, and a controller for outputting the control signal which gives instructions to make a polarization plane of the input lightwave the reference direction based on a polarization signal from the polarizer.

Namely, the polarizer has its polarization plane set in a reference direction. The polarizer inputs the output lightwave rotated by the rotator, and outputs the polarization signal depending on the polarization plane.

Based on the polarization signal, the controller outputs the control signal, to the rotator, which gives instructions to make the polarization plane of the input lightwave the same as that of the polarizer set in the reference direction.

Thus, the input lightwave is converted into the linear polarization having the polarization plane of the reference direction. The output lightwave can be utilized e.g. as an input lightwave of an optical circuit component having a polarization dependency whose characteristics are different depending on the polarization states.

Also, in the present invention according to the above-mentioned invention, the controller may be composed of an oscillator for outputting a modulating signal, a polarization signal detector for converting the polarization signal from the polarizer into an electric signal, a phase comparator for determining whether the modulating signal and the electric signal are in phase or opposite phase, or whether or not a frequency of the electric signal is twice as high as a frequency of the modulating signal, a rotator controller for outputting the control signal which designates a rotation angle, based on a determination result of the phase comparator so that the frequency of the electric signal becomes twice as high as the frequency of the modulating signal only when the modulating signal and the electric signal are in phase or opposite phase, and a modulator for modulating the control signal with the modulating signal.

Figure 1A:
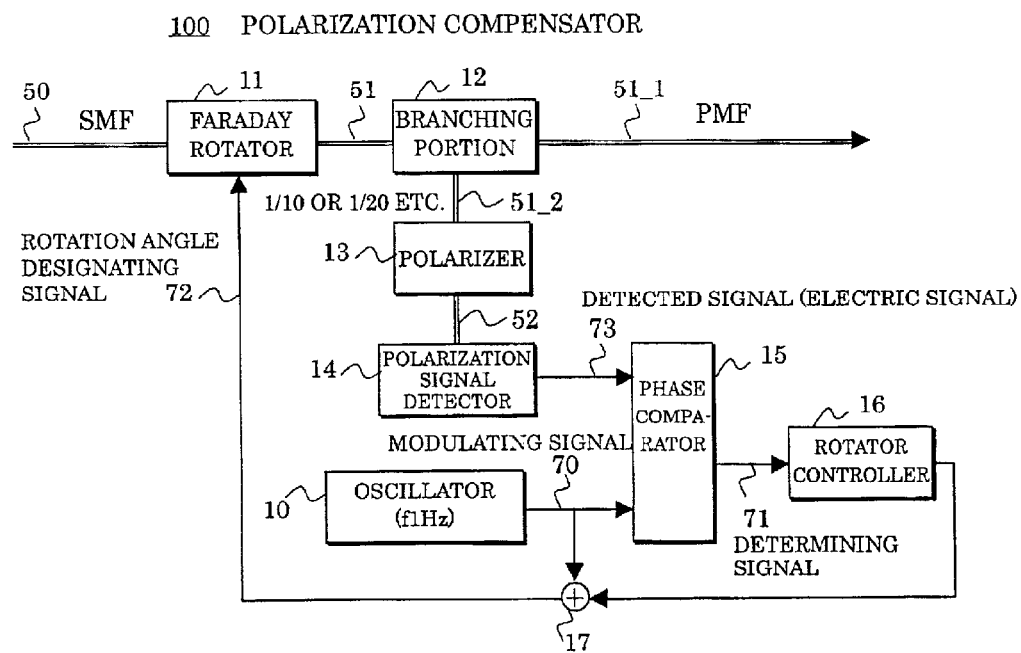
FIGS. 1A and 1B are block diagrams showing an embodiment (1) of a polarization compensator according to the present invention.

FIG. 1A shows an embodiment (1) of the present invention. In a polarization compensator 100 of the embodiment (1), when a lightwave 50 of a linear polarization is inputted, a rotator 11 rotates the polarization plane of the lightwave 50 by an angle designated by a rotation angle designating signal 72 from a rotator controller 16 to provide an output lightwave. A modulator 17 modulates the rotation angle designating signal 72 with a modulating signal 70 from an oscillator 10.

A polarizer 13 provides e.g. a lightwave 51_2 of the linear polarization, from the rotator 11, branched from a branching portion 12, to a polarization signal detector 14. When the polarization plane of the lightwave 51_2 is shifted from the polarization plane of the polarizer 13, a detected signal (electric signal) 73 by the polarization signal detector 14 and the modulating signal 70 are in phase or opposite phase, and when a polarization plane of a lightwave 51 is the same as that of the polarizer 13, the frequency of the detected signal 73 becomes twice as high as that of the modulating signal 70.

Figure 1B:
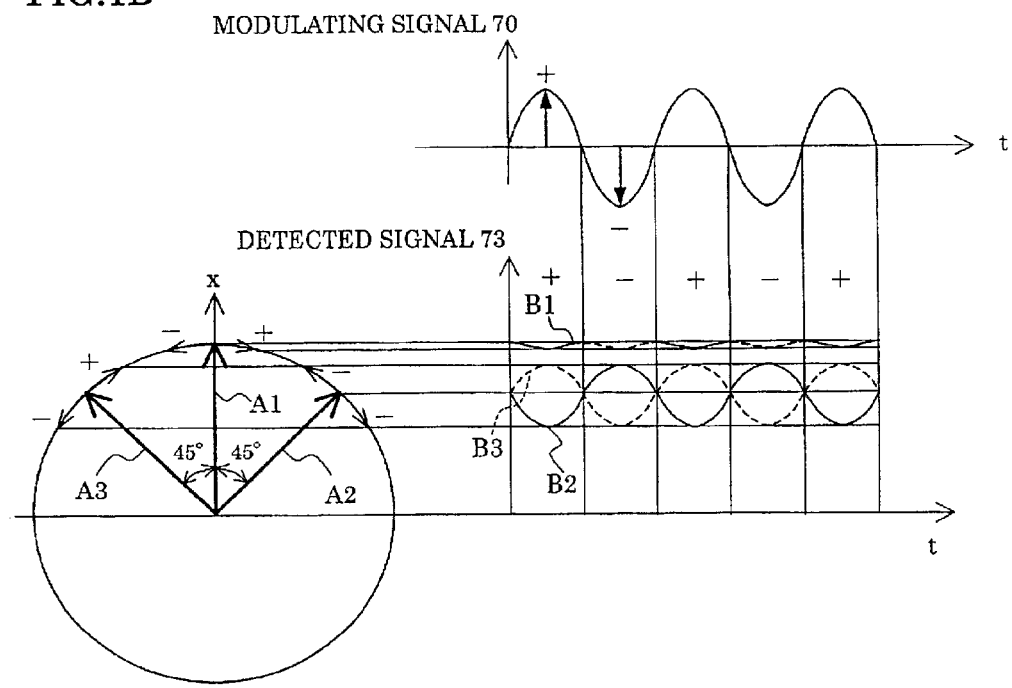

FIG. 1B shows a correspondence between the modulating signal 70 and the detected signal 73. The circle on the left side of FIG. 1B shows the polarizer 13, where the direction of the polarization plane of the polarizer 13 is x-axis. It is shown in FIG. 1B that the angles of the polarization planes for lightwaves A1–A3 of the linear polarizations inputted to the polarizer 13 are respectively 0°, +45°, and −45° from the polarization plane of the polarizer 13, and the angles are modulated with the modulating signal 70.

The polarization signal detector 14 converts the lightwave A1 into a detected signal 73 of a waveform B1. The frequency of the detected signal 73 is twice as high as that of the modulating signal 70, as shown in FIG. 1B. The polarization signal detector 14 converts the lightwaves A2 and A3 into the detected signal 73 of the waveform B2 (waveform in solid lines) which is in opposite phase with the modulating signal 70 and into a detected signal 73 of a waveform B3 (waveform in dashed lines) which is in phase with the modulating signal 70, respectively.

Also, the amplitudes of the waveforms B2 and B3 respectively change corresponding to the angles of the polarization planes for the lightwaves A2 and A3, and the angle of the polarization plane for the polarizer 13.

The phase comparator 15 provides a determining signal 71, to the rotator controller 16, for indicating whether the detected signal 73 and the modulating signal 70 are in phase or opposite phase, or whether or not the frequency of the detected signal 73 is twice as high as that of the modulating signal 70.

When the phase comparator 15 indicates that the modulating signal 70 and the electric signal 73 are in phase or opposite phase, the rotator controller 16 outputs the control signal (rotation angle designating signal) 72 for rotating the lightwave 50 of the linear polarization in the direction for coinciding the polarization plane of the linear polarization 51 with that of the polarizer 13.

On the other hand, when the frequency of the electric signal 73 is twice as high as that of the modulating signal 70, the rotator controller 16 maintains the present rotation angle designating signal 72.

Thus, without a mechanical optical circuit, the polarization plane of the linear polarization outputted from the rotator 11 can be made the same as that designated by the polarizer 13. It is to be noted that while the case where the above-mentioned control is processed by an analog signal is mentioned, the similar control process can be performed by a digital circuit.

Also, in the above-mentioned embodiment (1), a branching portion may be provided for branching an output lightwave from the rotator to be provided to the polarizer.

Namely, as shown in FIG. 1A, the lightwave 51_2, which is the output lightwave 51 from the rotator 11 branched at the branching portion 12, may be provided to the polarizer 13.

Also, in the above-mentioned embodiment (1), a branching portion may be provided for branching an output lightwave from the polarizer to be provided to the polarization signal detector.

Figure 2:
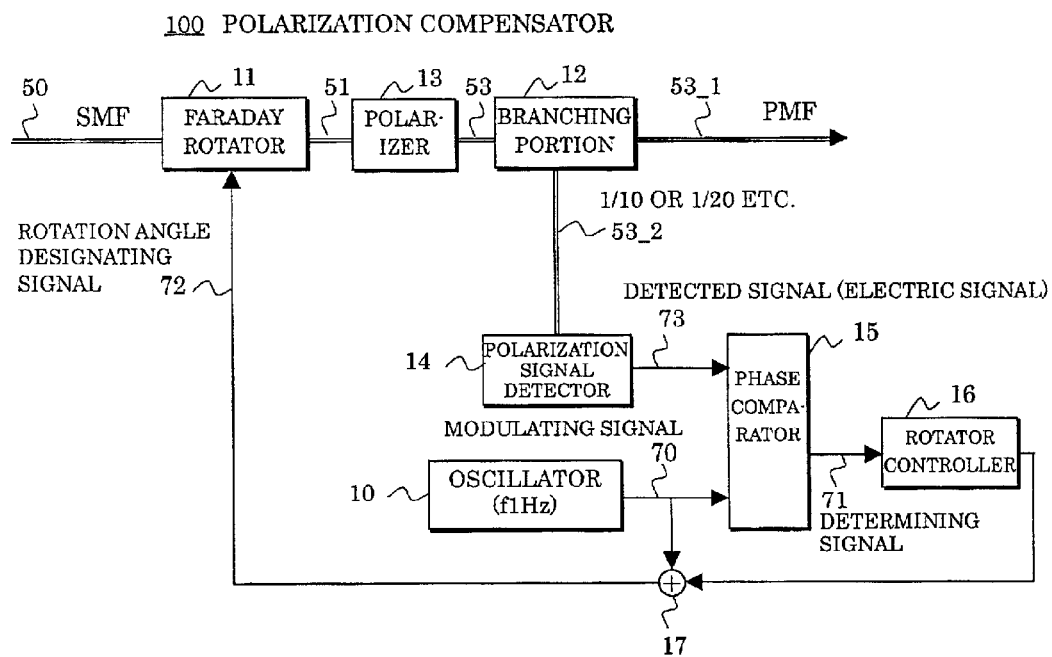
FIG. 2 is a block diagram showing an embodiment (2) of a polarization compensator according to the present invention.

FIG. 2 shows an embodiment (2) of the present invention. This embodiment (2) shows a polarization compensator 100 different from that shown in FIG. 1A. This polarization compensator 100 is different from that shown in FIG. 1A in that the polarizer 13, which is inserted between the branching portion 12 and the polarization signal detector 14 in FIG. 1A, is shifted to be inserted between the rotator 11 and the branching portion 12.

A lightwave 53_2 inputted to the polarization signal detector 14 is in the same polarization state as the case in FIG. 1A since only the polarizer 13 and the branching portion 12 are exchanged. In the polarization compensator 100 thus arranged, the input lightwave 50 of the elliptical polarization is outputted as a linear polarization by the polarizer 13.

Also, in the above-mentioned embodiment (2), when the rotator is named a first rotator, a second rotator may be provided for receiving a lightwave branched from the branching portion to be provided to the polarizer, the controller may be composed of an oscillator for outputting a modulating signal, a second rotator controller for controlling a rotation angle of the second rotator with the modulating signal, a polarization signal detector for converting the polarization signal from the polarizer into an electric signal, a phase comparator for determining whether the modulating signal and the electric signal are in phase or opposite phase, or whether or not a frequency of the electric signal is twice as high as a frequency of the modulating signal, and a first rotator controller for outputting the control signal which designates a rotation angle of the first rotator, based on a determination result of the phase comparator so that the frequency of the electric signal becomes twice as high as the frequency of the modulating signal only when the modulating signal and the electric signal are in phase or opposite phase.

The basic arrangement of this polarization compensator is the same as the polarization compensator 100 shown in FIG. 1A. However, this polarization compensator is different from that shown in FIG. 1A as follows: The second rotator is inserted between the branching portion 12 which branches the lightwave from the rotator 11 and the polarizer 13; no modulator 17 is provided; and not the control signal (rotation angle designating signal) 72 but the polarization plane of the lightwave inputted to the second rotator is modulated with the modulating signal 70.

The principle of this operation is the same as that of the polarization compensator 100 shown in FIG. 1A. The polarization signal detector 14 converts the lightwave modulated with the modulating signal 70 into the electric signal. The first rotator is controlled based on the detected signal (electric signal) 73 and the modulating signal 70. Accordingly, different from the polarization compensator 100 shown in FIG. 1A, the output lightwave of the polarization compensator is not modulated with the modulating signal.

Also, in the above-mentioned embodiment (2), when the modulating signal and the electric signal are in phase or opposite phase, the phase comparator may include an amplitude of the electric signal in the determination result to be notified to the rotator controller, and the rotator controller may output the control signal based on the amplitude.

Namely, when the modulating signal and the electric signal are in phase or opposite phase, the rotator controller 16 may output the control signal (rotation angle designating signal) 72 based on the amplitude of the detected signal 73 notified from the phase comparator 15.

Also, in the above-mentioned embodiment (2), when the polarizer is named a first polarizer, a second polarizer, having a polarization plane set in a direction different from the reference direction, for inputting a lightwave branched from the branching portion may be further provided, and the controller may be composed of a first polarization signal detector for converting the polarization signal from the first polarizer into a first electric signal, a second polarization signal detector for converting a polarization signal from the second polarizer into a second electric signal, and a rotator controller for outputting the control signal which designates a rotation angle of the rotator based on a difference between the first and the second electric signals.

The difference between this polarization compensator and the polarization compensator 100 shown in FIG. 1A are as follows: This polarization compensator has no oscillator 10, no phase comparator 15, and no modulator 17; and further has the second polarizer 13 and the second polarization signal detector 14, which input the lightwave from the rotator 11, whose arrangements are the same as those of the branching portion 12, the polarizer (first polarizer) 13, and the polarization signal detector (first polarization signal detector) 14. Also, in this polarization compensator, different from the polarization compensator 100 in FIG. 1A, the rotator controller 16 inputs the detected signal 73 from the polarization signal detector 14 and the second detected signal from the second polarization signal detector to control the rotator 11 based on their difference. Accordingly, the control signal (rotation angle designating signal) 72 is not modulated with the modulating signal 70.

The principle of this operation is as follows: By utilizing that the difference between the detected signal 73 and the second detected signal changes depending on the angle between the polarization plane of the lightwave from the rotator 11 and the reference direction, the rotator controller 16 controls the rotation angle of the rotator 11 so that the polarization plane of the output lightwave may assume the reference direction (or direction at a predetermined angle from the reference direction).

Also, the above-mentioned polarization compensator may comprise: a rotator for rotating a polarization plane of an input lightwave by an angle designated with a control signal to provide an output lightwave, a first ¼ wave plate for inputting the output lightwave of the rotator, a polarization compensator, of the above-mentioned embodiments (1) and (2), for inputting the output lightwave of the first ¼ wave plate, a branching portion for branching the output lightwave of the polarization compensator, a second ¼ wave plate for inputting the lightwave branched from the branching portion, a polarizer, having a polarization plane set in a reference direction, for inputting the output lightwave of the second ¼ wave plate, and a controller for outputting the control signal which gives instructions to convert the input lightwave into a linear polarization having the polarization plane of the reference direction based on a polarization signal from the polarizer.

Namely, the polarizer is set in the same reference direction as that of the above-mentioned polarization compensator. When the input lightwave is a linear polarization, this lightwave is converted into a circular polarization by the ¼ wave plate to pass through without being converted at the above-mentioned polarization compensator, so that the circular polarization is returned to the linear polarization at the second ¼ wave plate.

The direction of the linear polarization is different from that of the input lightwave by 90° because the linear polarization has passed twice through the ¼ wave plate. Based on the difference 90° and the polarization signal from the polarizer, the controller provides the control signal to the rotator so as to make the polarization plane of the input lightwave the reference direction or orientation.

When the input lightwave is a circular polarization, the input lightwave is converted into a linear polarization at the ¼ wave plate, and converted into the polarization plane of the reference direction by the above-mentioned polarization compensator according to the present invention. It is to be noted that the description in case where the input lightwave is an elliptical polarization is omitted.

Thus, the input lightwave is converted into the linear polarization having the polarization plane of the reference direction.

Also, in the above-mentioned embodiments (1) and (2), the controller may be composed of an oscillator for outputting a modulating signal, a polarization signal detector for converting the polarization signal from the polarizer into an electric signal, a phase comparator for determining whether the modulating signal and the electric signal are in phase or opposite phase, or whether or not a frequency of the electric signal is twice as high as a frequency of the modulating signal, and a rotator controller for outputting the control signal which designates a rotation angle, based on a determination result of the phase comparator so that the frequency of the electric signal becomes twice as high as the frequency of the modulating signal only when the modulating signal and the electric signal are in phase or opposite phase.

Figure 3:
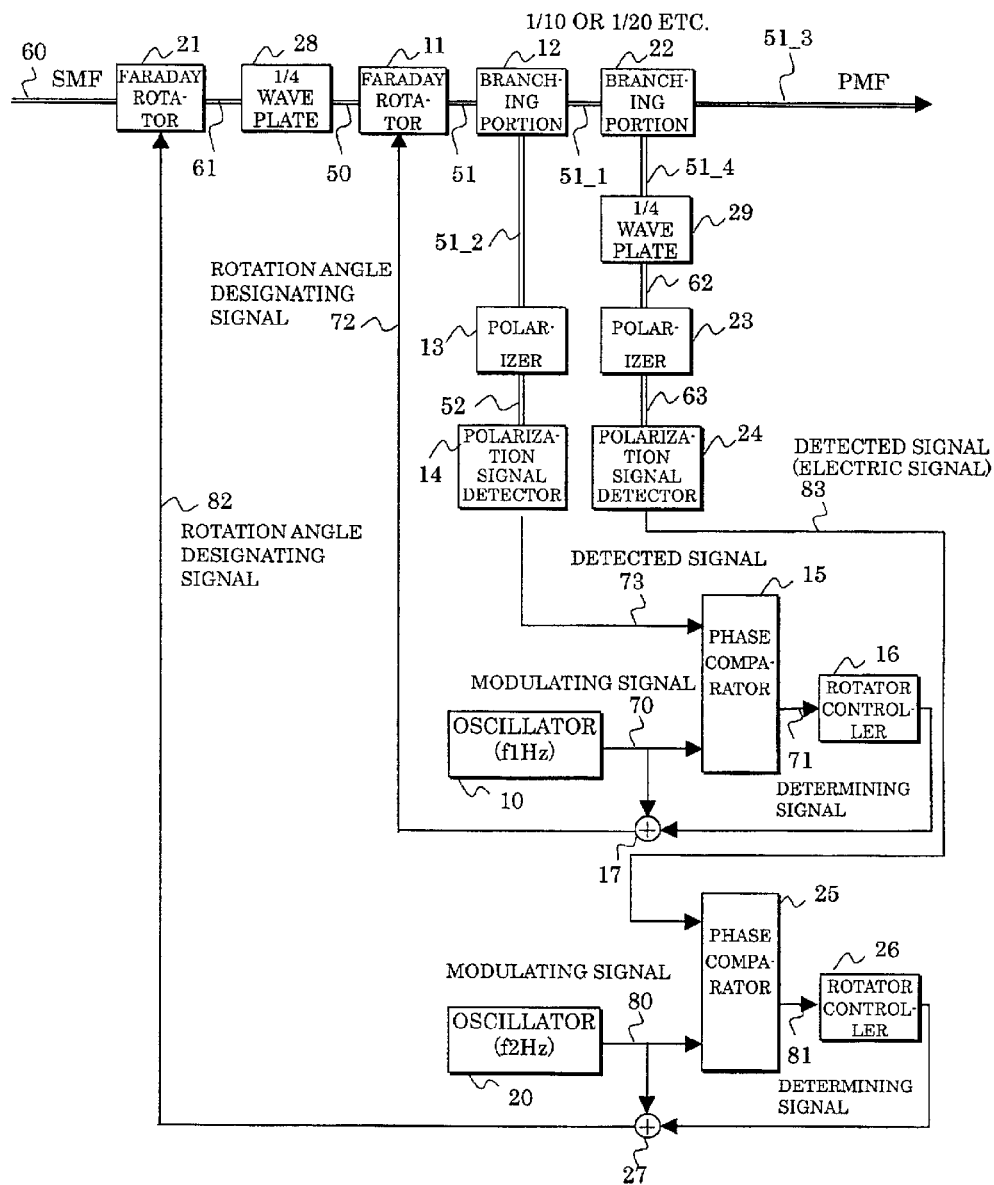
FIG. 3 is a block diagram showing an embodiment (3) of a polarization compensator according to the present invention.

FIG. 3 shows an embodiment (3) of the present invention. This embodiment (3) shows a polarization compensator 100 different from those shown in the embodiments (1) and (2). In this polarization compensator 100 shown in FIG. 3, a rotator 21 and a ¼ wave plate 28 are connected in cascade at the previous stage of the polarization compensator 100 shown in FIG. 1, so that a lightwave 60 is inputted to the rotator 21.

A branching portion 22 arranged at the subsequent stage of the rotator 11 outputs a lightwave 51_4 that is the branched lightwave 51. It is to be noted that the branching portion 22 which branches the lightwave 51 may be arranged either just subsequent to the rotator 11 or the branching portion 12. A ¼ wave plate 29 inputs the lightwave 51_4 to be provided to a polarizer 23.

The arrangements and the operations of an oscillator 20, the polarizer 23, a polarization signal detector 24, a phase comparator 25, and a rotator controller 26 are the same as those of the oscillator 10, the polarizer 13, the polarization signal detector 14, the phase comparator 15, and the rotator controller 16 shown in FIG. 2.

Namely, the rotation angle of the lightwave 60 passing through the rotator 21 is controlled with a rotation angle designating signal 82 based on a detected signal (electric signal) 83 detected by the polarization signal detector 24 and the modulating signal 70 from the oscillator 20.

Figure 4:
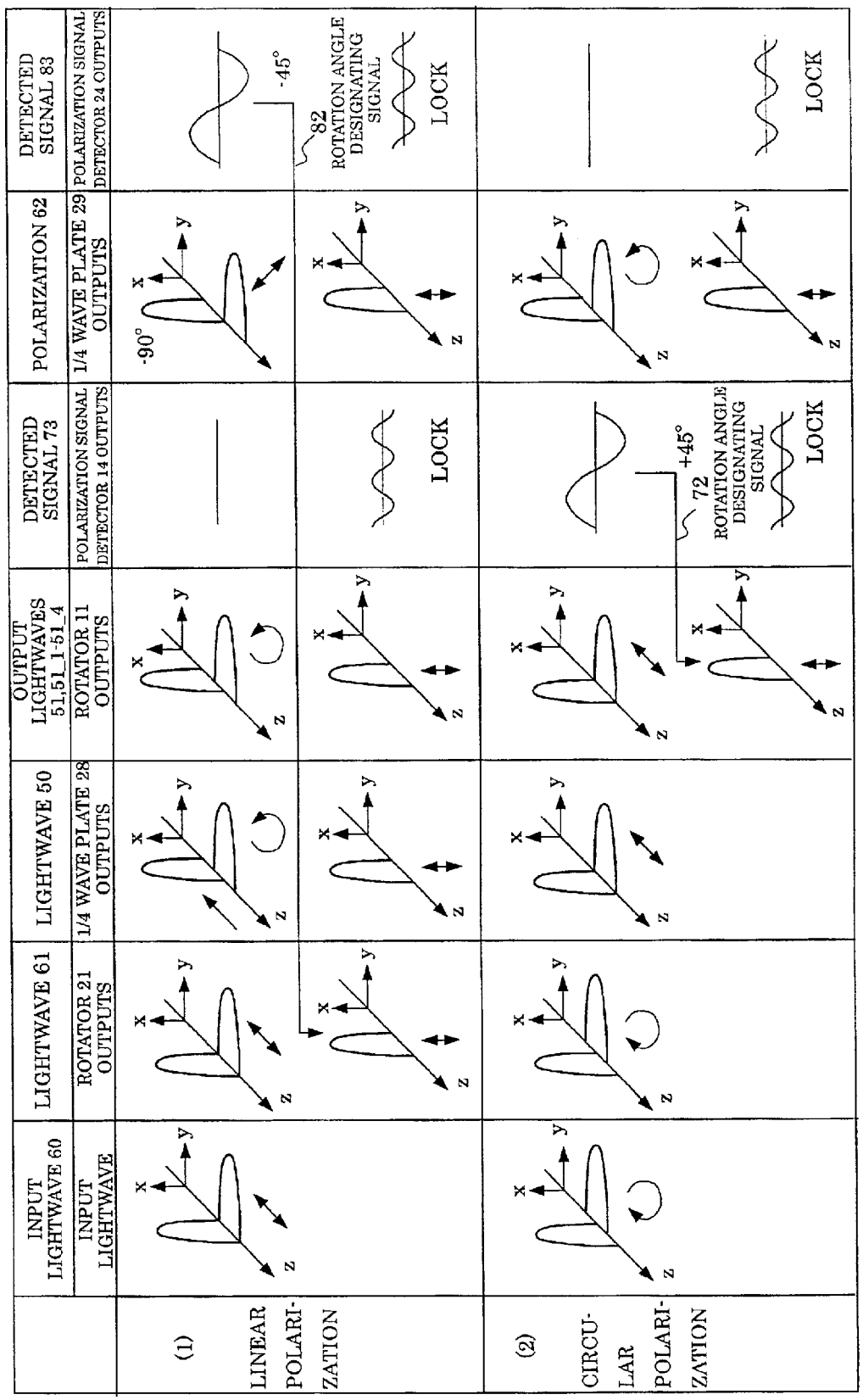
FIG. 4 is a diagram showing an operation waveform in an embodiment (3) of a polarization compensator according to the present invention.

FIG. 4 shows an example of operation waveforms of the polarization compensator 100 shown in FIG. 3. FIG. 4 shows operations in case where a linear polarization (1) and a circular polarization (2), whose polarization planes are inclined by 45° with respect to xz plane, are inputted. It is to be noted that in FIG. 4, z-axis indicates a travelling direction of light, x-axis indicates directions of a proper polarization axis of the ¼ wave plates 28 and 29, and xz plane indicates the direction of the polarization planes of the polarizers 13 and 23.

In Case Lightwave 60 is Linear Polarization

In the upper stage of the linear polarization (1) in FIG. 4, the rotator 21 outputs the input lightwave 60 as it is in the form of a lightwave 61 since the rotator 21 is not controlled. The ¼ wave plate 28 converts the lightwave 61 into the lightwave 50 of the circular polarization to be outputted. The rotator 11 outputs the input lightwave 50 as it is in the form of the lightwave 51 since the rotator 21 is not controlled at first.

At this time, the polarization signal detector 14 receives a lightwave 52 of the circular polarization received through the polarizer 13 to output the detected signal 73 which fluctuates between the top and bottom of the amplitude at a high speed. From this detected signal 73, the phase comparator 15 does not detect a signal in phase or opposite phase with the modulating signal 70, nor a signal whose frequency is twice as high as that of the modulating signal 70. Accordingly, the rotator controller 16 does not control the rotation angle of the lightwave at the rotator 11.

The ¼ wave plate 29 converts the lightwave 51_4 of the circular polarization received through the branching portions 12 and 22 into a lightwave 62 of the linear polarization to be provided to the polarizer 23. The polarizer 23 provides a lightwave 63 that is an element of xz plane direction within the lightwave 62, to the polarization signal detector 24.

The polarization signal detector 24 provides the detected signal 83, that is the lightwave 63 converted into the electric signal, to the phase comparator 25. The phase comparator 25 outputs a determining signal 81 indicating that a signal in opposite phase with the modulating signal 80 is detected. The rotator controller 26 which has received the determining signal 81 provides the rotation angle designating signal 82 designating the rotation of −45° to the rotator 21.

In the lower stage of the linear polarization (1) in FIG. 4, the rotator 21 converts the input lightwave 60 into the lightwave 61 of the linear polarization of 0° gradient with respect to the xz plane. Accordingly, the ¼ wave plate 28 outputs the same lightwave 50 as the lightwave 61.

As a result, the loop of the branching portion 12, the polarizer 13, the polarization signal detector 14, the phase comparator 15, and the rotator controller 16 maintains (locks) the control state as long as there is no variation on the polarization plane of the input lightwave 60.

Also, the ¼ wave plate 29 to which the branched light of the lightwave 51 is provided from the branching portion 22 outputs the lightwave 62 of the polarization as provided. As a result, the loop of the branching portion 22, the ¼ wave plate 29, the polarizer 23, the polarization signal detector 24, the phase comparator 25, and the rotator controller 26 maintains (locks) the present rotation angle designating signal 82.

In Case Lightwave 60 is Circular Polarization

In the upper half of the circular polarization (2) in FIG. 4, the rotator 21 outputs the inputted lightwave 60 as it is in the form of the lightwave 61 since the rotator 21 is not controlled. The ¼ wave plate 28 converts the lightwave 61 into the lightwave 50 of the linear polarization to be outputted. The rotator 11 outputs the inputted lightwave 50 as it is in the form of the lightwave 51 since the rotator 21 is not controlled.

The polarization signal detector 14 receives the lightwave 52 of the linear polarization received through the polarizer 13 to output the detected signal 73. From this detected signal 73, the phase comparator 15 detects a signal in phase with the modulating signal 70, and outputs the determining signal 71 indicating that the signal in phase with the modulating signal 70 is detected. The rotator controller 16 which has received the determining signal 71 provides the rotation angle designating signal 72 for designating the rotation of 45° to the rotator 11.

In the lower half of the circular polarization (2) in FIG. 4, the rotator 11 converts the input lightwave 50 into the lightwave 51 of the linear polarization of 0° gradient with respect to the xz plane. As a result, the loop formed of the branching portion 12, the polarizer 13, the polarization signal detector 14, the phase comparator 15, and the rotator controller 16 maintains (locks) the control state as long as there is no variation on the polarization plane of the input lightwave 60.

Also, the ¼ wave plate 29 to which the branched light 51_4 of the lightwave 51 is provided from the branching portion 22 outputs the lightwave 62 of the polarization as provided. As a result, the loop formed of the branching portion 22, the ¼ wave plate 29, the polarizer 23, the polarization signal detector 24, the phase comparator 25, and the rotator controller 26 maintains (locks) the present rotation angle designating signal 82.

In Case Lightwave 60 is Elliptical Polarization

When a major axis of a lightwave in an elliptical polarization is inclined with respect to the x-axis, the rotator 21 rotates the polarization plane of the lightwave so that the longer axis may coincide with the x-axis, whereby the ¼ wave plate 28 converts the lightwave of the elliptical polarization into the linear polarization having the polarization plane inclined with respect to the x-axis.

The rotator 11 converts the linear polarization into a linear polarization having a polarization plane which coincides with the x-axis.

Also, in the above-mentioned embodiment (3), when the rotator is named a second rotator, a third rotator inserted between the branching portion and the polarizer may be provided, and the controller may be composed of an oscillator for outputting a modulating signal, a third rotator controller for controlling a rotation angle of the third rotator with the modulating signal, a polarization signal detector for converting the polarization signal from the polarizer into an electric signal, a phase comparator for determining whether the modulating signal and the electric signal are in phase or opposite phase, or whether or not a frequency of the electric signal is twice as high as a frequency of the modulating signal, and a second rotator controller for outputting the control signal which designates a rotation angle of the second rotator, based on a determination result of the phase comparator so that the frequency of the electric signal becomes twice as high as the frequency of the modulating signal only when the modulating signal and the electric signal are in phase or opposite phase.

Namely, a third rotator is inserted either between the branching portion and the ¼ wave plate, or the ¼ wave plate and the polarizer. The second rotator controller may control the second rotator based on the lightwave modulated with a modulating signal at the third rotator. The principle of this control has been described above.

It is to be noted that the rotator included in the polarization compensator of the above-mentioned present invention is named the first rotator to determine the other rotators to be the second and the third rotators.

Also, in the above-mentioned embodiment (3), when the polarizer is named a first polarizer, a second polarizer, having a polarization plane set in a direction different from the reference direction, for inputting the lightwave from the ¼ wave plate may be further provided, and the controller may be composed of a first polarization signal detector for converting the polarization signal from the first polarizer into a first electric signal, a second polarization signal detector for converting a polarization signal from the second polarizer into a second electric signal, and a rotator controller for outputting the control signal which designates a rotation angle of the rotator based on a difference between the first and the second electric signals.

Also, in the above-mentioned embodiments (1)–(3), the controller may be composed of only a light/electricity converter for converting the polarization signal into an electric signal, and an electric circuit for outputting the control signal based on the electric signal.

Also, a wavelength division multiplexing apparatus according to the present invention may comprise: a plurality of polarization compensators according to the above-mentioned embodiments (1)–(3) and a coupler for coupling a lightwave of a linear polarization from the polarization compensators, and the polarization compensators and the coupler are connected so as to prevent polarization planes of adjoining lightwaves from coinciding with each other.

Namely, the polarization compensator of the embodiment (3) for example, converts the lightwave of the linear polarization, the elliptical polarization, or the circular polarization into the lightwave of the linear polarization set on the polarization plane in a predetermined direction to output the converted lightwave. The polarization compensator and a coupler junction are connected so as to prevent the polarization planes of the lightwaves whose wavelengths are adjoining among the lightwave of the linear polarization from coinciding with each other.

Thus, it becomes easy that the lightwave of the linear polarization, the circular polarization, or the elliptical polarization inputted to the polarization compensator is coupled so as to prevent the polarization planes of the lightwaves whose wavelengths are adjoining from coinciding with each other.

Also, in the above-mentioned wavelength division multiplexing apparatus, a junction, having a connecting mechanism which prevents the polarization planes of the adjoining lightwaves from coinciding with each other, may be provided between the polarization compensators and the coupler.

Namely, a junction can be arranged such that the polarization compensators and the coupler are connected so as to prevent the polarization planes of the adjoining lightwaves from coinciding with each other.

It is to be noted that in the above-mentioned wavelength division multiplexing apparatus, the polarization planes of the adjoining output lightwaves may be connected to be orthogonal.

Furthermore, a wavelength division multiplexing optical transmission apparatus according to the present invention may comprise: a plurality of optical transmitters whose output wavelengths are different from each other, and the above-mentioned wavelength division multiplexing apparatus for inputting the output lightwaves of the optical transmitters.

Figure 5:
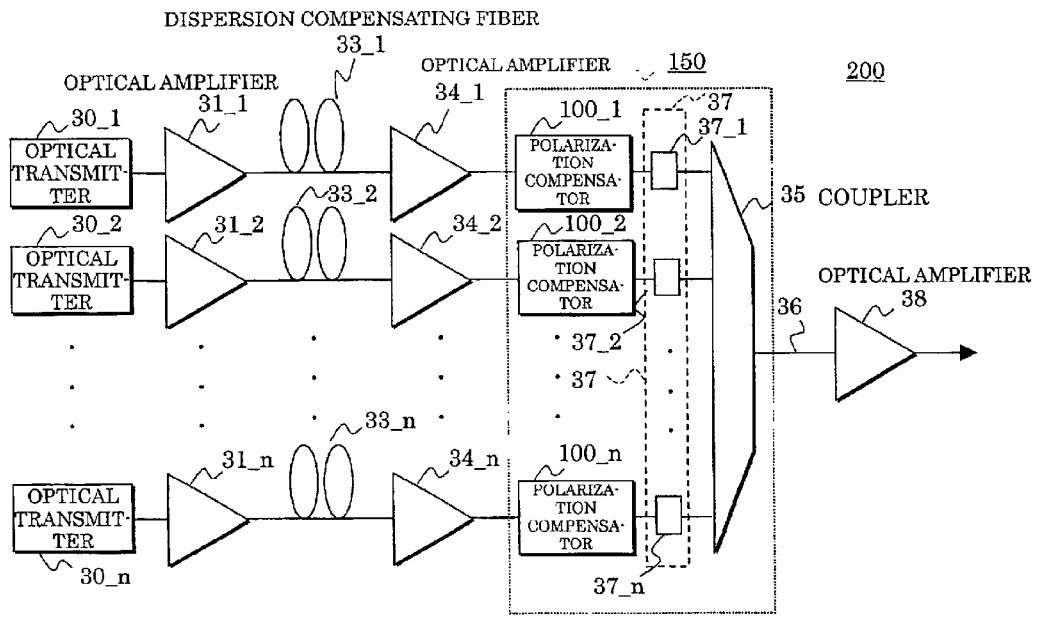
FIG. 5 is a block diagram showing an embodiment (4) of a wavelength division multiplexing apparatus and a wavelength division multiplexing optical transmission apparatus according to the present invention using a polarization compensator of the present invention.

FIG. 5 shows an embodiment (4) of the present invention. This embodiment (4) shows a WDM optical transmission apparatus 200 using a WDM apparatus 150 including the polarization comparators 100_1-100_n of the above-mentioned embodiments (1)–(3).

Figure 9:
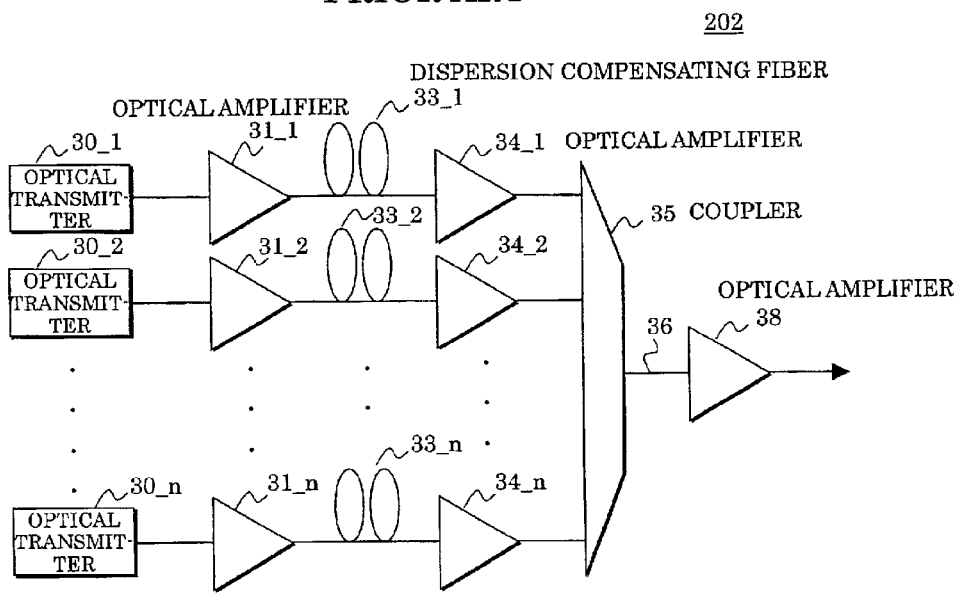
FIG. 9 is a block diagram showing an example (2) of a prior art wavelength division multiplexing optical transmission apparatus.

The optical transmission apparatus 200 is basically different from the prior art optical transmission apparatus 202 shown in FIG. 9 in that the polarization compensators 100_1-100_n (hereinafter, occasionally represented by a reference numeral 100) are respectively inserted between optical amplifiers 34_1-34_n (hereinafter, represented by a reference numeral 34) and the coupler 35.

The WDM apparatus 150 is composed of the polarization compensators 100, junctions 37_1-37_n (hereinafter, represented by a reference numeral 37), and the coupler 35. The junctions 37 connect the polarization compensators 100 and the coupler 35 so that the polarization planes of the lightwaves whose frequencies are adjoining may be orthogonal.

It is to be noted that the junction 37 is not always a connector, and the polarization compensators 100 and the coupler 35 may be preliminarily united so that the polarization planes of the lightwaves, whose frequencies are adjoining, from the polarization compensators 100, may be orthogonal.

Thus, since the polarization compensators 100 convert the lightwaves of the linear polarization, the elliptical polarization, or the circular polarization from the polarization optical amplifiers 34 into a linear polarization having a predetermined polarization plane, the polarization planes of the lightwaves whose frequencies are adjoining can be easily orthogonalized.

Figure 6:
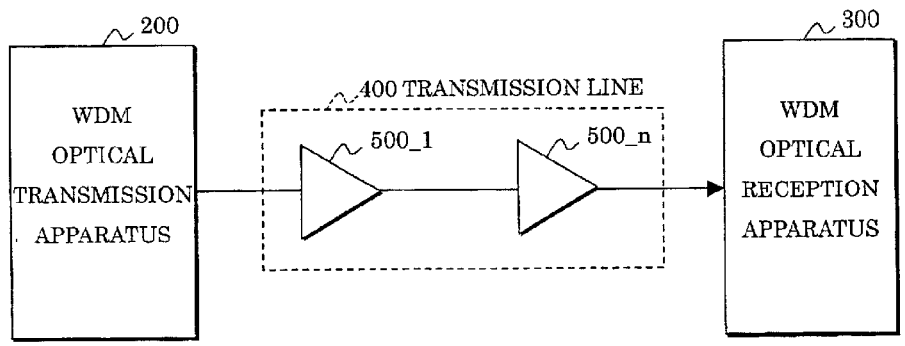
FIG. 6 is a block diagram showing an embodiment (5) of a wavelength division multiplexing optical transmission apparatus according to the present invention using a polarization compensator of the present invention.
Figure 7A:
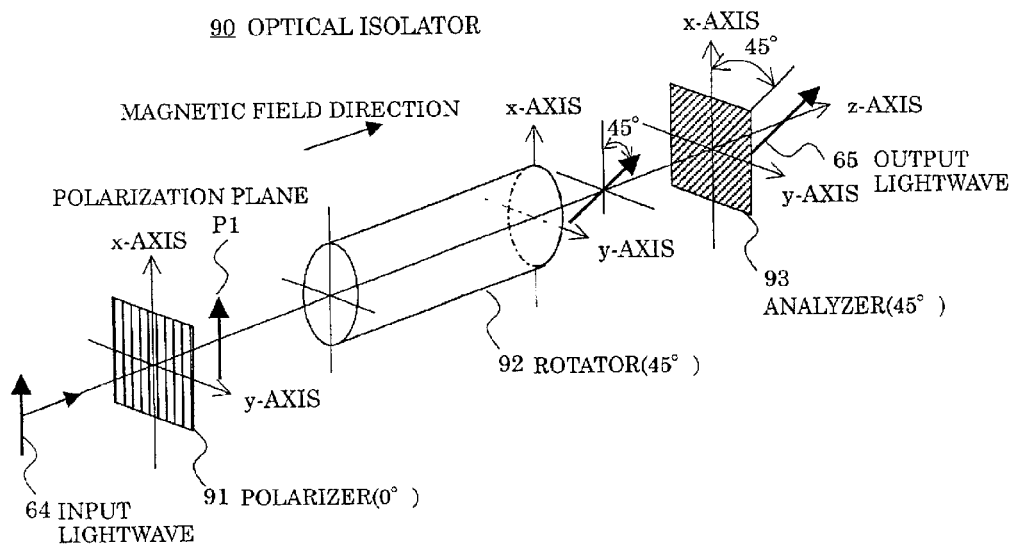
FIGS. 7A and 7B are block diagrams showing a general optical isolator.
Figure 7B:
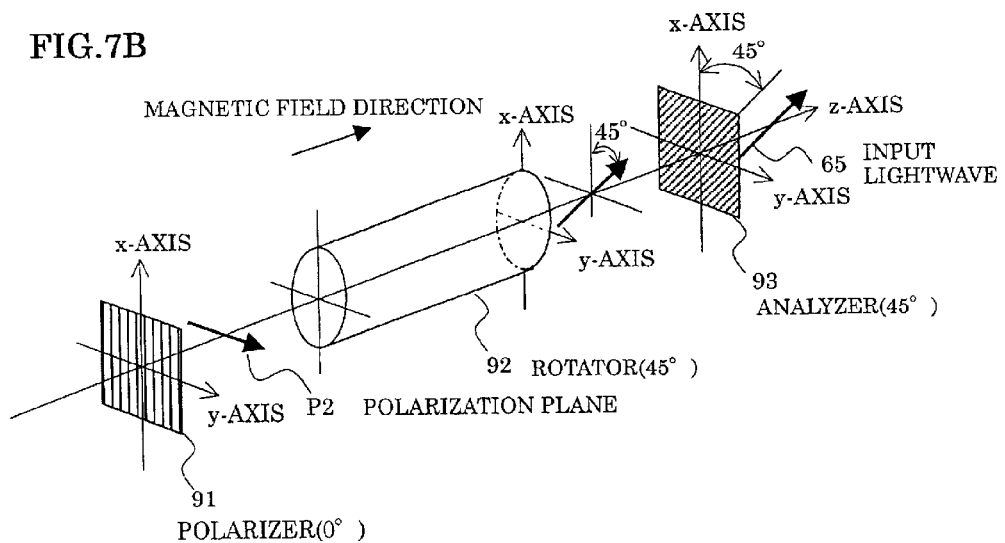
Figure 8:
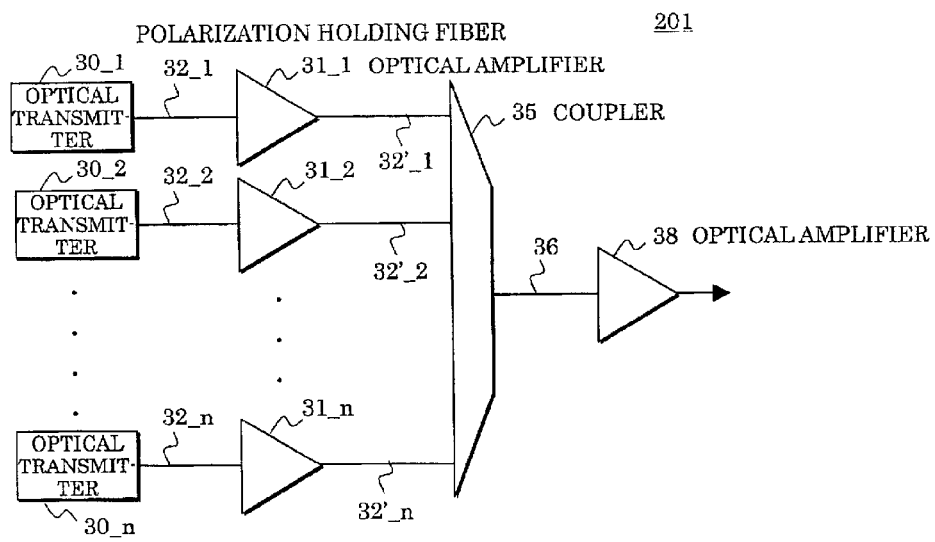
FIG. 8 is a block diagram showing an example (1) of a prior art wavelength division multiplexing optical transmission apparatus.

FIG. 6 shows an embodiment (5) of the present invention. This embodiment (5) shows an optical transmission apparatus using the WDM optical transmission apparatus 200 of the embodiment (4). In this optical transmission apparatus, a WDM lightwave signal is transmitted from the optical transmission apparatus 200 to an optical reception apparatus 300 through relaying amplifiers 500_1 and 500_2 included in a transmission line 400.

Thus, in the transmission line 400, it becomes possible to reduce (1) crosstalks between signals, especially a transmission penalty by coherent crosstalks between signals caused by a spread spectrum which occurs upon a signal modulation, and (2) a transmission penalty caused by a non-linear effect of an optical fiber.

As described above, a polarization compensator according to the present invention is arranged such that a controller controls a rotator to orient a polarization plane of an input lightwave to a polarization plane of a reference polarizer. Therefore, it becomes possible to compensate a lightwave of a linear polarization to a linear polarization having a polarization plane of a predetermined direction.

Also, the polarization compensator according to the present invention is arranged such that the controller receives an output lightwave from the polarization compensator, of the above-mentioned present invention, which inputs the input lightwave through the rotator and the first ¼ wave plate, through a second ¼ wave plate and a polarizer having a polarization plane set in the reference direction, and the input lightwave is compensated to a linear polarization having a polarization plane of the reference direction based on a polarization signal. Therefore, it becomes possible to compensate the lightwave of a linear polarization, a circular polarization, or an elliptical polarization to a linear polarization having a polarization plane of a predetermined direction.

Also, a wavelength division multiplexing apparatus is arranged such that a plurality of polarization compensators according to the present invention and a coupler are connected so as to prevent the polarization planes of the lightwaves whose wavelengths are adjoining from coinciding with each other. Preferably, the polarization compensators and the coupler are connected directly or with connectors so that the polarization planes are orthogonal. Therefore, it becomes possible to solve (1) a problem of crosstalks between signals, especially a problem of coherent crosstalks between signals caused by a spread spectrum upon a signal modulation, and (2) a problem of crosstalks between wavelengths caused by a non-linear effect of an optical fiber.

Furthermore, a wavelength division multiplexing optical transmission apparatus can be arranged by connecting a plurality of optical transmission apparatuses for transmitting the lightwaves whose wavelengths are different from each other to the wavelength division multiplexing apparatus according to the present invention, it becomes easy to make orthogonal the output lightwaves whose wavelengths are adjoining. Thus, waveform deterioration caused by the above-mentioned crosstalks hardly occurs on a transmission line, and an economical transmission line can be designed.

What is claim is:

1. A polarization compensator comprising:
   a rotator for rotating an input lightwave by an angle designated with a control signal modulated by a modulating signal and providing an output lightwave;
   a polarizer, having a polarization plane set in a reference direction, for inputting the output lightwave and for outputting a polarization signal; and
   a controller for outputting the control signal which gives instructions to make a polarization plane of the input lightwave the reference direction based on a phase difference between an electric signal detected from the polarization signal and the modulating signal.

2. The polarization compensator as claimed in claim 1 wherein the controller comprises an oscillator for outputting the modulating signal; a polarization signal detector for converting the polarization signal from the polarizer into the electric signal; a phase comparator for determining whether the modulating signal and the electric signal are in phase or opposite phase, or whether or not a frequency of the electric signal is twice as high as a frequency of the modulating signal; a rotator controller for outputting the control signal which designates a rotation angle, based on a determination result of the phase comparator so that the frequency of the electric signal becomes twice as high as the frequency of the modulating signal only when the modulating signal and the electric signal are in phase or opposite phase; and a modulator for modulating the control signal with the modulating signal.

3. The polarization compensator as claimed in claim 2 wherein when the modulating signal and the electric signal are in phase or opposite phase, the phase comparator includes an amplitude of the electric signal in the determination result to be notified to the rotator controller, and the rotator controller outputs the control signal based on the amplitude.

4. A wavelength division multiplexing apparatus comprising:
   a plurality of polarization compensators, according to claim 2; and
   a coupler for coupling a lightwave of a linear polarization from the polarization compensators;
   the polarization compensators and the coupler are connected so as to prevent polarization planes of adjoining lightwaves from coinciding with each other.

5. The wavelength division multiplexing apparatus as claimed in claim 4 wherein a junction, having a connecting mechanism which prevents the polarization planes of the adjoining lightwaves from coinciding with each other, is provided between the polarization compensators and the coupler.

6. A wavelength division multiplexing optical transmission apparatus comprising:
   a plurality of optical transmitters whose output wavelengths are different from each other; and
   the wavelength division multiplexing apparatus, according to claim 5, for inputting the output lightwaves of the optical transmitters.

7. The wavelength division multiplexing apparatus as claimed in claim 4 wherein the polarization planes of the adjoining output lightwaves are connected to be orthogonal.

8. A wavelength division multiplexing optical transmission apparatus comprising:
   a plurality of optical transmitters whose output wavelengths are different from each other; and
   the wavelength division multiplexing apparatus, according to claim 4, for inputting the output lightwaves of the optical transmitters.

9. The polarization compensator as claimed in claim 1, further comprising a branching portion for branching an output lightwave from the rotator to be provided to the polarizer.

10. The polarization compensator as claimed in claim 9, further comprising, when the rotator is named a first rotator, a second rotator for receiving a lightwave branched from the branching portion to be provided to the polarizer;
    the controller including an oscillator for outputting the modulating signal; a second rotator controller for controlling a rotation angle of the second rotator with the modulating signal; a polarization signal detector for converting the polarization signal from the polarizer into the electric signal; a phase comparator for determining whether the modulating signal and the electric signal are in phase or opposite phase, or whether or not a frequency of the electric signal is twice as high as a frequency of the modulating signal; and a first rotator controller for outputting the control signal which designates a rotation angle of the first rotator, based on a determination result of the phase comparator so that the frequency of the electric signal becomes twice as high as the frequency of the modulating signal only when the modulating signal and the electric signal are in phase or opposite phase.

11. The polarization compensator as claimed in claim 10 wherein when the modulating signal and the electric signal are in phase or opposite phase, the phase comparator includes an amplitude of the electric signal in the determination result to be notified to the rotator controller, and the rotator controller outputs the control signal based on the amplitude.

12. The polarization compensator as claimed in claim 9, further comprising, when the polarizer is named a first polarizer, a second polarizer, having a polarization plane set in a direction different from the reference direction, for inputting a lightwave branched from the branching portion;
    the controller including a first polarization signal detector for converting the polarization signal from the first polarizer into a first electric signal; a second polarization signal detector for converting a polarization signal from the second polarizer into a second electric signal; and a rotator controller for outputting the control signal which designates a rotation angle of the rotator based on a difference between the first and the second electric signals.

13. The polarization compensator as claimed in claim 1, further comprising a branching portion for branching an output lightwave from the polarizer to be provided to the polarization signal detector.

14. A polarization compensator comprising:
    a rotator for rotating a polarization plane of an input lightwave by an angle designated with a control signal to provide an output lightwave;
    a first ¼ wave plate for inputting the output lightwave of the rotator;
    a polarization compensator, according to claim 1, for inputting the output lightwave of the first ¼ wave plate;
    a branching portion for branching the output lightwave of the polarization compensator;
    a second ¼ wave plate for inputting the lightwave branched from the branching portion;
    a polarizer, having a polarization plane set in a reference direction, for inputting the output lightwave of the second ¼ wave plate; and
    a controller for outputting the control signal which gives instructions to compensate the input lightwave to a linear polarization having the polarization plane of the reference direction based on a polarization signal from the polarizer.

15. The polarization compensator as claimed in claim 14 wherein the controller comprises an oscillator for outputting the modulating signal; a polarization signal detector for converting the polarization signal from the polarizer into the electric signal; a phase comparator for determining whether the modulating signal and the electric signal are in phase or opposite phase, or whether or not a frequency of the electric signal is twice as high as a frequency of the modulating signal; and a rotator controller for outputting the control signal which designates a rotation angle, based on a determination result of the phase comparator so that the frequency of the electric signal becomes twice as high as the frequency of the modulating signal only when the modulating signal and the electric signal are in phase or opposite phase.

16. The polarization compensator as claimed in claim 14, further comprising, when the rotator is named a second rotator, a third rotator inserted between the branching portion and the polarizer;
the controller including an oscillator for outputting the modulating signal; a third rotator controller for controlling a rotation angle of the third rotator with the modulating signal; a polarization signal detector for converting the polarization signal from the polarizer into the electric signal; a phase comparator for determining whether the modulating signal and the electric signal are in phase or opposite phase, or whether or not a frequency of the electric signal is twice as high as a frequency of the modulating signal; and a second rotator controller for outputting the control signal which designates a rotation angle of the second rotator, based on a determination result of the phase comparator so that the frequency of the electric signal becomes twice as high as the frequency of the modulating signal only when the modulating signal and the electric signal are in phase or opposite phase.

17. The polarization compensator as claimed in claim 14, further comprising, when the polarizer is named a first polarizer, a second polarizer, having a polarization plane set in a direction different from the reference direction, for inputting the lightwave from the ¼ wave plate;
the controller including a first polarization signal detector for converting the polarization signal from the first polarizer into a first electric signal; a second polarization signal detector for converting a polarization signal from the second polarizer into a second electric signal; and a rotator controller for outputting the control signal which designates a rotation angle of the rotator based on a difference between the first and the second electric signals.

18. A wavelength division multiplexing apparatus comprising:
a plurality of polarization compensators, according to claim 14; and
a coupler for coupling a lightwave of a linear polarization from the polarization compensators;
the polarization compensators and the coupler are connected so as to prevent polarization planes of adjoining lightwaves from coinciding with each other.

19. The wavelength division multiplexing apparatus as claimed in claim 18 wherein a junction, having a connecting mechanism which prevents the polarization planes of the adjoining lightwaves from coinciding with each other, is provided between the polarization compensators and the coupler.

20. The wavelength division multiplexing apparatus as claimed in claim 18 wherein the polarization planes of the adjoining output lightwaves are connected to be orthogonal.

21. The polarization compensator as claimed in claim 1 wherein the controller comprises only a light/electricity converter for converting the polarization signal into an electric signal; and an electric circuit for outputting the control signal based on the electric signal.

22. A polarization compensator comprising:
a rotator for rotating an input lightwave by an angle designated with a control signal and providing an output lightwave;
a polarizer, having a polarization plane set in a reference direction, for inputting the output lightwave; and
a controller for outputting the control signal which gives instructions to make a polarization plane of the input lightwave the reference direction based on a polarization signal from the polarizer,
wherein the controller comprises:
an oscillator for outputting a modulating signal,
a polarization signal detector for converting the polarization signal from the polarizer into an electric signal,
a phase comparator for determining whether the modulating signal and the electric signal are in phase or opposite phase, or whether or not a frequency of the electric signal is twice as high as a frequency of the modulating signal,
a rotator controller for outputting the control signal which designates a rotation angle, based on a determination result of the phase comparator so that the frequency of the electric signal becomes twice as high as the frequency of the modulating signal only when the modulating signal and the electric signal are in phase or opposite phase, and
a modulator for modulating the control signal with the modulating signal.

23. The polarization compensator as claimed in claim 22 wherein when the modulating signal and the electric signal are in phase or opposite phase, the phase comparator includes an amplitude of the electric signal in the determination result to be notified to the rotator controller, and the rotator controller outputs the control signal based on the amplitude.

24. A wavelength division multiplexing apparatus comprising:
a plurality of polarization compensators, according to claim 22; and
a coupler for coupling a lightwave of a linear polarization from the polarization compensators;
the polarization compensators and the coupler are connected so as to prevent polarization planes of adjoining lightwaves from coinciding with each other.

25. The wavelength division multiplexing apparatus as claimed in claim 24 wherein a junction, having a connecting mechanism which prevents the polarization planes of the adjoining lightwaves from coinciding with each other, is provided between the polarization compensators and the coupler.

26. A wavelength division multiplexing optical transmission apparatus comprising:
a plurality of optical transmitters whose output wavelengths are different from each other, and
the wavelength division multiplexing apparatus, according to claim 25, for inputting the output lightwaves of the optical transmitters.

27. The wavelength division multiplexing apparatus as claimed in claim 24 wherein the polarization planes of the adjoining output lightwaves are connected to be orthogonal.

28. A wavelength division multiplexing optical transmission apparatus comprising:
- a plurality of optical transmitters whose output wavelengths are different from each other; and
- the wavelength division multiplexing apparatus, according to claim 24, for inputting the output lightwaves of the optical transmitters.

29. A polarization compensator comprising:
- a rotator for rotating an input lightwave by an angle designated with a control signal and providing an output lightwave;
- a polarizer, having a polarization plane set in a reference direction, for inputting the output lightwave;
- a controller for outputting the control signal which gives instructions to make a polarization plane of the input lightwave the reference direction based on a polarization signal from the polarizer, and
- a branching portion for branching an output lightwave from the rotator to be provided to the polarizer,
- the polarization compensator further comprising when the rotator is named a first rotator, a second rotator for receiving a lightwave branched from the branching portion to be provided to the polarizer;
- the controller including an oscillator for outputting a modulating signal; a second rotator controller for controlling a rotation angle of the second rotator with the modulating signal; a polarization signal detector for converting the polarization signal from the polarizer into an electric signal; a phase comparator for determining whether the modulating signal and the electric signal are in phase or opposite phase, or whether or not a frequency of the electric signal is twice as high as a frequency of the modulating signal; and a first rotator controller for outputting the control signal which designates a rotation angle of the first rotator, based on a determination result of the phase comparator so that the frequency of the electric signal becomes twice as high as the frequency of the modulating signal only when the modulating signal and the electric signal are in phase or opposite phase.

30. The polarization compensator as claimed in claim 29 wherein when the modulating signal and the electric signal are in phase or opposite phase, the phase comparator includes an amplitude of the electric signal in the determination result to be notified to the rotator controller, and the rotator controller outputs the control signal based on the amplitude.

31. A polarization compensator comprising:
- a rotator for rotating an input lightwave by an angle designated with a control signal and providing an output lightwave;
- a polarizer, having a polarization plane set in a reference direction, for inputting the output lightwave:
- a controller for outputting the control signal which gives instructions to make a polarization plane of the input lightwave the reference direction based on a polarization signal from the polarizer; and
- a branching portion for branching an output lightwave from the rotator to be provided to the polarizer,
- the polarization compensator further comprising, when the polarizer is named a first polarizer, a second polarizer, having a polarization plane set in a direction different from the reference direction, for inputting a lightwave branched from the branching portion;
- the controller including a first polarization signal detector for converting the polarization signal from the first polarizer into a first electric signal; a second polarization signal detector for converting a polarization signal from the second polarizer into a second electric signal; and a rotator controller for outputting the control signal which designates a rotation angle of the rotator based on a difference between the first and the second electric signals.

32. A polarization compensator comprising:
- a rotator for rotating a polarization plane of an input lightwave by an angle designated with a control signal to provide an output lightwave;
- a first ¼ wave plate for inputting the output lightwave of the rotator;
- a polarization compensator, for inputting the output lightwave of the first ¼ wave plate;
- a branching portion for branching the output lightwave of the polarization compensator;
- a second ¼ wave plate for inputting the lightwave branched from the branching portion;
- a polarizer, having a polarization plane set in a reference direction, for inputting the output lightwave of the second ¼ wave plate; and
- a controller for outputting the control signal which gives instructions to compensate the input lightwave to a linear polarization having the polarization plane of the reference direction based on a polarization signal from the polarizer,
- wherein the controller comprises an oscillator for outputting a modulating signal; a polarization signal detector for converting the polarization signal from the polarizer into an electric signal; a phase comparator for determining whether the modulating signal and the electric signal are in phase or opposite phase, or whether or not a frequency of the electric signal is twice as high as a frequency of the modulating signal; and a rotator controller for outputting the control signal which designates a rotation angle, based on a determination result of the phase comparator so that the frequency of the electric signal becomes twice as high as the frequency of the modulating signal only when the modulating signal and the electric signal are in phase or opposite phase,
- wherein the polarization compensator further comprises:
  - a rotator for rotating an input lightwave by an angle designated with a control signal and providing an output lightwave;
  - a polarizer, having a polarization plane set in a reference direction, for inputting the output lightwave; and
  - a controller for outputting the control signal which gives instructions to make a polarization plane of the input lightwave the reference direction based on a polarization signal from the polarizer.

33. A polarization compensator comprising:
- a rotator for rotating a polarization plane of an input lightwave by an angle designated with a control signal to provide an output lightwave;
- a first ¼ wave plate for inputting the output lightwave of the rotator;
- a polarization compensator, for inputting the output lightwave of the first ¼ wave plate;

a branching portion for branching the output lightwave of the polarization compensator;

a second ¼ wave plate for inputting the lightwave branched from the branching portion;

a polarizer, having a polarization plane set in a reference direction, for inputting the output lightwave of the second ¼ wave plate; and a controller for outputting the control signal which gives instructions to compensate the input lightwave to a linear polarization having the polarization plane of the reference direction based on a polarization signal from the polarizer, the polarization compensator further comprising, when the rotator is named a second rotator, a third rotator inserted between the branching portion and the polarizer;

the controller including an oscillator for outputting a modulating signal; a third rotator controller for controlling a rotation angle of the third rotator with the modulating signal; a polarization signal detector for converting the polarization signal from the polarizer into an electric signal; a phase comparator for determining whether the modulating signal and the electric signal are in phase or opposite phase, or whether or not a frequency of the electric signal is twice as high as a frequency of the modulating signal; and a second rotator controller for outputting the control signal which designates a rotation angle of the second rotator, based on a determination result of the phase comparator so that the frequency of the electric signal becomes twice as high as the frequency of the modulating signal only when the modulating signal and the electric signal are in phase or opposite phase, wherein the polarization compensator further comprises:
a rotator for rotating an input lightwave by an angle designated with a control signal and providing an output lightwave;
a polarizer, having a polarization plane set in a reference direction, for inputting the output lightwave; and
a controller for outputting the control signal which gives instructions to make a polarization plane of the input lightwave the reference direction based on a polarization signal from the polarizer.

34. A polarization compensator comprising:
a rotator for rotating a polarization plane of an input lightwave by an angle designated with a control signal to provide an output lightwave;
a first ¼ wave plate for inputting the output lightwave of the rotator;
a polarization compensator, for inputting the output lightwave of the first ¼ wave plate;
a branching portion for branching the output lightwave of the polarization compensator;
a second ¼ wave plate for inputting the lightwave branched from the branching portion;
a polarizer, having a polarization plane set in a reference direction, for inputting the output lightwave of the second ¼ wave plate; and
a controller for outputting the control signal which gives instructions to compensate the input lightwave to a linear polarization having the polarization plane of the reference direction based on a polarization signal from the polarizer,
the polarization compensator further comprising, when the polarizer is named a first polarizer, a second polarizer, having a polarization plane set in a direction different from the reference direction, for inputting the lightwave from the ¼ wave plate;
the controller including a first polarization signal detector for converting the polarization signal from the first polarizer into a first electric signal; a second polarization signal detector for converting a polarization signal from the second polarizer into a second electric signal; and a rotator controller for outputting the control signal which designates a rotation angle of the rotator based on a difference between the first and the second electric signals,
wherein the polarization compensator further comprises:
a rotator for rotating an input lightwave by an angle designated with a control signal and providing an output lightwave;
a polarizer, having a polarization plane set in a reference direction, for inputting the output lightwave; and
a controller for outputting the control signal which gives instructions to make a polarization plane of the input lightwave the reference direction based on a polarization signal from the polarizer.

35. A wavelength division multiplexing apparatus comprising: a plurality of polarization compensators; and a coupler for coupling a lightwave of a linear polarization from the polarization compensators; the polarization compensators and the coupler are connected so as to prevent polarization planes of adjoining lightwaves from coinciding with each other, wherein each of the plurality of polarization compensators comprises:
a rotator for rotating a polarization plane of an input lightwave by an angle designated with a control signal to provide an output lightwave;
a first ¼ wave plate for inputting the output lightwave of the rotator;
a polarization compensator, for inputting the output lightwave of the first ¼ wave plate;
a branching portion for branching the output lightwave of the polarization compensator;
a second ¼ wave plate for inputting the lightwave branched from the branching portion;
a polarizer, having a polarization plane set in a reference direction, for inputting the output lightwave of the second ¼ wave plate; and
a controller for outputting the control signal which gives instructions to compensate the input lightwave to a linear polarization having the polarization plane of the reference direction based on a polarization signal from the polarizer,
wherein the polarization compensator further comprises:
a rotator for rotating an input lightwave by an angle designated with a control signal and providing an output lightwave;
a polarizer, having a polarization plane set in a reference direction, for inputting the output lightwave; and
a controller for outputting the control signal which gives instructions to make a polarization plane of the input lightwave the reference direction based on a polarization signal from the polarizer.

36. A polarization compensator comprising:
rotating means for rotating an input lightwave by an angle designated with a control signal modulated by a modulating signal and providing an output lightwave;

polarizing means, having a polarization plane set in a reference direction, for inputting the output lightwave and for outputting a polarization signal; and means for outputting the control signal which gives inscriptions to make a polarization plane of the input lightwave the reference direction based on a phase difference between an electric signal detected from the polarization signal and the modulating signal.

* * * * *

UNITED STATES PATENT AND TRADEMARK OFFICE
CERTIFICATE OF CORRECTION

PATENT NO. : 6,762,837 B2
DATED : July 13, 2004
INVENTOR(S) : Hiroyuki Iwata

It is certified that error appears in the above-identified patent and that said Letters Patent is hereby corrected as shown below:

Column 25,
Line 5, change "inscriptions" to -- instructions --.

Signed and Sealed this

Thirtieth Day of November, 2004

JON W. DUDAS
*Director of the United States Patent and Trademark Office*